US009529184B2

(12) United States Patent
Fukutake et al.

(10) Patent No.: US 9,529,184 B2
(45) Date of Patent: Dec. 27, 2016

(54) IMAGING APPARATUS AND PROGRAM

(75) Inventors: Naoki Fukutake, Tokyo (JP); Shinichi Nakajima, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 621 days.

(21) Appl. No.: 13/363,061

(22) Filed: Jan. 31, 2012

(65) Prior Publication Data

US 2012/0262562 A1 Oct. 18, 2012

Related U.S. Application Data

(60) Provisional application No. 61/534,189, filed on Sep. 13, 2011.

(30) Foreign Application Priority Data

Apr. 12, 2011 (JP) ................................ P2011-087821

(51) Int. Cl.
*G06K 9/46* (2006.01)
*G02B 21/14* (2006.01)
*G02B 21/36* (2006.01)

(52) U.S. Cl.
CPC ............ *G02B 21/14* (2013.01); *G02B 21/367* (2013.01)

(58) Field of Classification Search
USPC ........................................................ 348/79
See application file for complete search history.

(56) References Cited

U.S. PATENT DOCUMENTS

| 6,839,166 | B2 | 1/2005 | Fukushima et al. |
| 7,711,210 | B2 | 5/2010 | Hosoda et al. |
| 2001/0021914 | A1 | 9/2001 | Jacobi et al. |
| 2001/0024531 | A1* | 9/2001 | Edgar ........................... 382/254 |
| 2003/0030902 | A1* | 2/2003 | Fukushima et al. .......... 359/388 |
| 2005/0046930 | A1* | 3/2005 | Olschewski ................... 359/368 |
| 2005/0234719 | A1 | 10/2005 | Hosoda et al. |
| 2008/0062510 | A1* | 3/2008 | Spill et al. .................... 359/368 |

(Continued)

FOREIGN PATENT DOCUMENTS

| JP | 06-003599 A | 1/1994 |
| JP | 2003-121749 A | 4/2003 |

(Continued)

OTHER PUBLICATIONS

Zhou et al. "Development of phase-contrast X-ray imaging techniques and potential medical applications". Physica Medica, vol. 24, Issue 3, Sep. 2008. pp. 129-148.*

(Continued)

*Primary Examiner* — Christopher S Kelley
*Assistant Examiner* — Zhihan Zhou
(74) *Attorney, Agent, or Firm* — Shapiro, Gabor and Rosenberger, PLLC

(57) ABSTRACT

An imaging apparatus includes an imaging unit that images a test object, an analysis unit that outputs a feature amount of an image which is captured by the imaging unit, a storage unit that stores an evaluation function which has the image feature amount as a variable, for evaluation of the image, a selection unit that selects one image from two or more images including an image specified based on a value of the evaluation function, and a changing unit that changes the evaluation function based on the one image in a case where the one image selected by the selection unit is different from the specified image.

9 Claims, 12 Drawing Sheets

(56) References Cited

U.S. PATENT DOCUMENTS

2009/0303597 A1* 12/2009 Miyawaki et al. ........... 359/559
2010/0002950 A1* 1/2010 Arieli et al. .................. 382/255
2011/0249911 A1* 10/2011 Determan et al. ............ 382/282
2012/0026310 A1* 2/2012 Mizukusa et al. ............. 348/78

FOREIGN PATENT DOCUMENTS

JP          2005-277981 A       10/2005
JP          2009-237109 A       10/2009
WO     WO 2010119790 A1 *   10/2010

OTHER PUBLICATIONS

International Search Report for International Patent Application No. PCT/JP2012/052567, mailed May 25, 2012.
Written Opinion of the International Search Authority for International Patent Application No. PCT/JP2012/052567, mailed May 25, 2012.
Office Action issued Feb. 28, 2015, in Chinese Patent Application No. 201280017763.6.
Office Action issued Mar. 2, 2015, in Japanese Patent Application No. 2011-087821.
Office Action issued Nov. 2, 2015, in Taiwanese Application No. 101106456.

* cited by examiner $Q(f) =$ SURFACE INTEGRAL OF $FT \times (1-cos(\alpha_{3r}))/N$ $Q(f) =$ SURFACE INTEGRAL OF $\underbrace{\text{ABSOLUTE VALUE OF FOURIER TRANSFORM OF IMAGE}}$ $\times$ $1 - \cos \alpha_{3r}$ $/N$ $N =$ SURFACE INTEGRAL OF ABSOLUTE VALUE OF FOURIER TRANSFORM OF IMAGE FIG. 12A
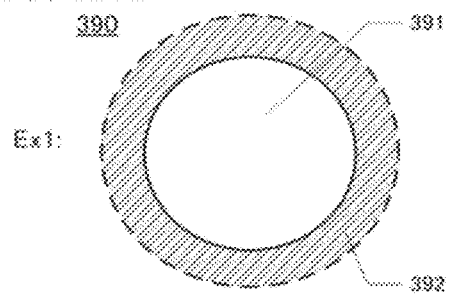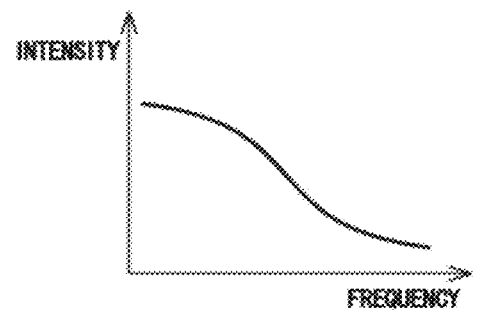
FIG. 12B
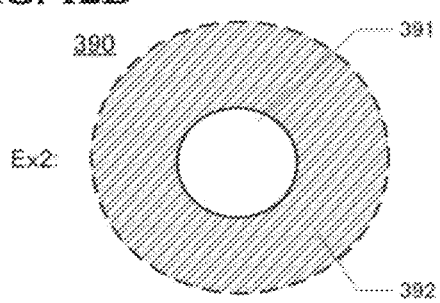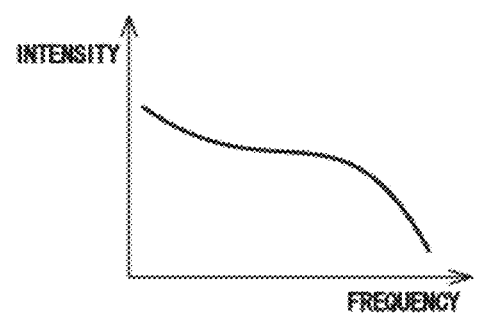
FIG. 12C
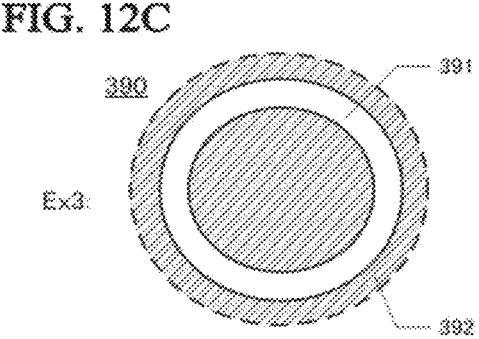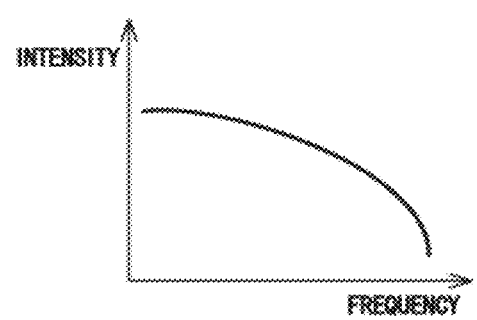
FIG. 12D
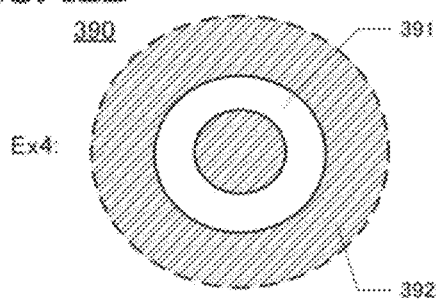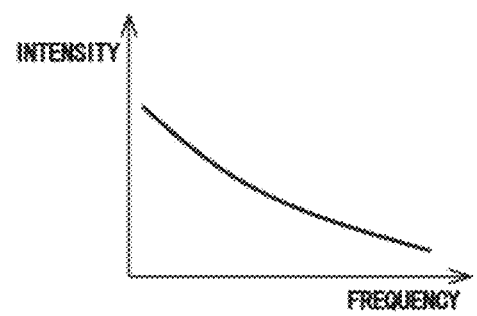

IMAGING APPARATUS AND PROGRAM

CROSS-REFERENCE TO RELATED APPLICATION

This application is a non-provisional application claiming priority to the benefit of U.S. provisional application No. 61/534,189, filed Sep. 13, 2011, and the Japanese Patent Application No. 2011-087821, filed Apr. 12, 2011. The entire contents of which are incorporated herein by reference.

BACKGROUND

1. Field of the Invention

The present invention relates to an imaging apparatus and a program which derive the intensity distribution of illumination light appropriate for observation. Particularly, the present invention relates to an imaging apparatus and a program which can obtain an image according to an observer's preference.

2. Description of Related Art

Generally, in bright-field microscopes, an intensity distribution of illumination light is adjusted by varying a circular aperture. In addition, there are cases where the shape of the aperture is selected and used through determination of an observer. In phase-contrast microscopes, generally, a ring aperture and a phase ring form the intensity distribution of illumination light.

Since the intensity distribution of illumination light has a great effect on an observed image of a test object, there has been study into making the observed image of the test object better by improving the circular aperture, the ring aperture, the phase ring, and the like. For example, Japanese Unexamined Patent Application Publication No. 2009-237109 shows a phase-contrast microscope in which a modulation unit is provided so as to surround a ring region where a phase ring is provided in a ring shape, and the modulation unit and regions other than the modulation unit are formed so as to have different transmission axes, and thereby contrast can be continuously variable.

SUMMARY

However, in the above-described microscope, shapes of the aperture are set to a degree, and thus there is a limitation on adjustment of the intensity distribution of illumination light. In addition, since even in a case where the shape of the aperture is selected it is selected based on the determination or experience of an observer, the shape of the aperture is not necessarily a shape which enables an image of the test object during observation to be observed in the best state. Further, the best state of a test object image is different for every person depending on the observers' preferences. Therefore, it is difficult for the shape of the aperture to be set automatically in the best state depending on observers' preferences, and for a test object to be observed. This is also difficult in a camera or the like which images landscapes or the like.

Aspects of the present invention provide an imaging apparatus and a program which derive the intensity distribution of illumination light appropriate to observe a test object according to an observer's preference.

An imaging apparatus according to a first aspect includes an imaging unit that images a test object, an analysis unit that outputs a feature amount of an image which is captured by the imaging unit, a storage unit that stores an evaluation function which has the image feature amount as a variable for evaluation of the image, a selection unit that selects one image from two or more images including an image specified based on a value of the evaluation function, and a changing unit that changes the evaluation function based on the one image in a case where the one image selected by the selection unit is different from the specified image.

A program according to a second aspect is a program for imaging a test object using an imaging apparatus having an imaging unit that images the test object and a computer that is connected to the imaging unit. The program enables the computer to execute outputting a feature amount of an image captured by the imaging unit, storing an evaluation function having the image feature amount as a variable for evaluation of the image, selecting one image from two or more images including an image specified based on a value of the evaluation function, and changing the evaluation function based on the one image in a case where the one image selected by the selection unit is different from the specified image.

According to aspects of the present invention, there are provided an imaging apparatus and a program which make a test object image suitable for an observer's preference.

BRIEF DESCRIPTION OF THE DRAWINGS

FIG. 12A is a diagram illustrating an example of the intensity distribution of illumination light and a spatial frequency component when Fourier transform is performed.

FIG. 12B is a diagram illustrating an example of the intensity distribution of illumination light and a spatial frequency component when Fourier transform is performed.

FIG. 12C is a diagram illustrating an example of the intensity distribution of illumination light and a spatial frequency component when Fourier transform is performed.

FIG. 12D is a diagram illustrating an example of the intensity distribution of illumination light and a spatial frequency component when Fourier transform is performed.

DESCRIPTION OF EMBODIMENTS (First Embodiment)

A microscope system 100 having a bright-field microscope which can freely change the shape of an aperture will be described as a first embodiment. The microscope system 100 derives the intensity distribution of illumination light appropriate to observe an image of a test object during observation in a good state and automatically adjusts the intensity distribution of illumination light.

<Microscope System 100>

Figure 1:
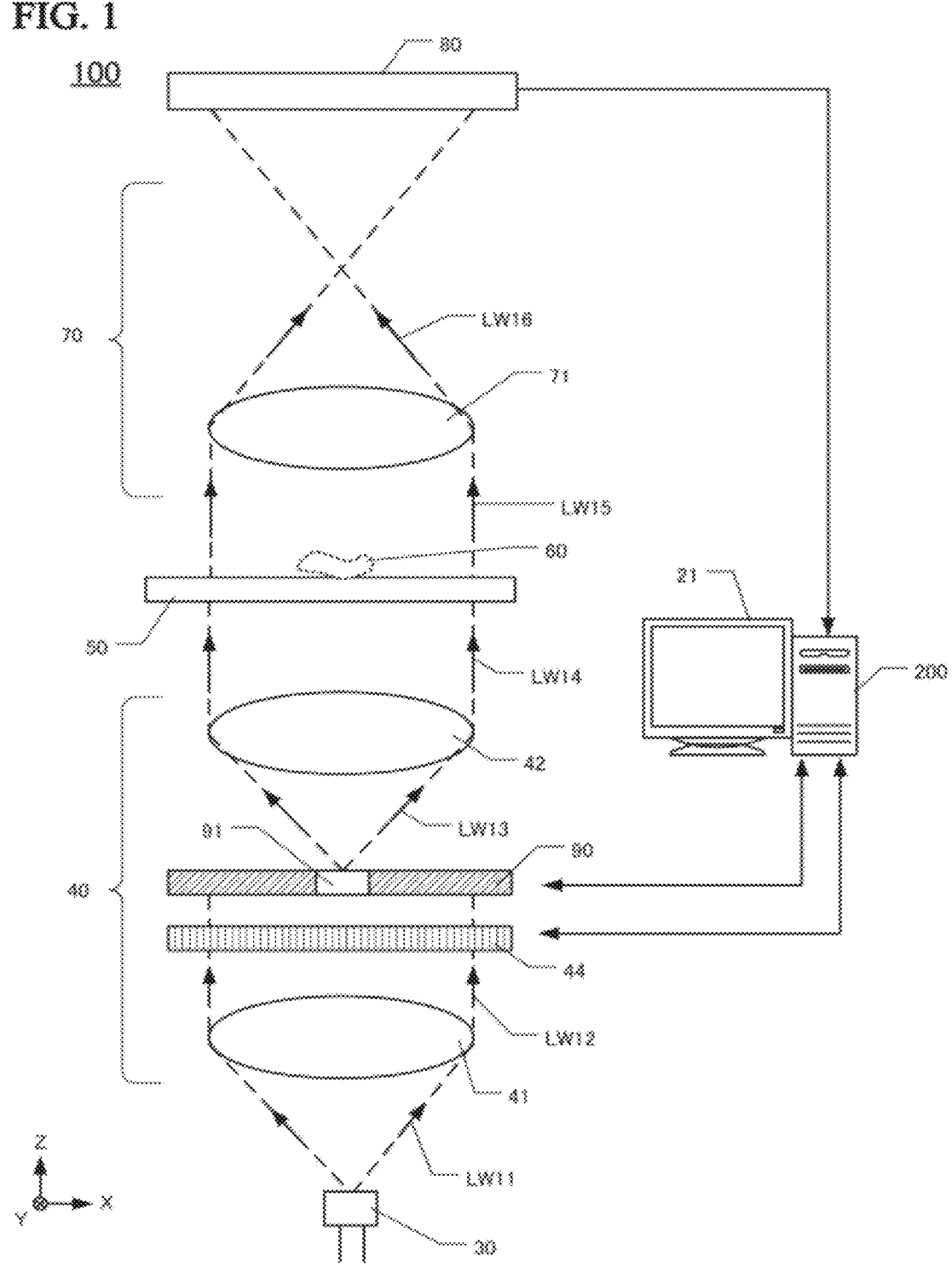
FIG. 1 is a schematic configuration diagram of a microscope system in the first embodiment.

FIG. 1 is a schematic configuration diagram of the microscope system 100. The microscope system 100 mainly includes an illumination light source 30, an illumination optical system 40, a stage 50, an imaging optical system 70, and an image sensor 80. The microscope system 100 is connected to a computer 200. Hereinafter, a description will be made assuming that the central axis of light beams emitted from the illumination light source 30 is the Z axis direction, and directions which are vertically mutually perpendicular to the Z axis are the X axis direction and the Y axis direction.

The illumination light source 30 irradiates, for example, a test object 60 with white illumination light. The illumination optical system 40 includes a first condenser lens 41, a wavelength filter 44, a first spatial light modulation device 90, and a second condenser lens 42. In addition, the imaging optical system 70 includes an objective lens 71. The stage 50 places the test object 60 having an unknown structure such as, for example, a cell tissue thereon, and can move in the X and Y axis directions. In addition, the imaging optical system 70 images transmitted light or reflected light of the test object 60 on the image sensor 80.

The first spatial light modulation device 90 of the illumination optical system 40 is disposed at, for example, a position forming a conjugate with respect to a position of the pupil of the imaging optical system 70 inside the illumination optical system 40. The first spatial light modulation device 90 may use, specifically, a liquid crystal panel or a digital micromirror device (DMD). Further, the first spatial light modulation device 90 has an illumination region 91 of which the size and the shape can be freely changed, and can arbitrarily vary the intensity distribution of illumination light by changing the size or the shape of the illumination region 91. That is to say, the first spatial light modulation device 90 can vary the intensity distribution of illumination light at the conjugate position of the pupil of the imaging optical system 70. Generally, if a diameter of the transmission region 91 of the first spatial light modulation device 90 increases, a resolution can increase through an increase in a numerical aperture of the transmitted light. Further, the wavelength filter 44 limits a wavelength of a transmitted light beam within a specific range. The wavelength filter 44 uses a band-pass filter which transmits, for example, only light of a wavelength in a specific range therethrough. The band-pass filter is prepared which is attachable and detachable and transmits a plurality of light beams of different wavelengths therethrough, and a wavelength of light which is transmitted through the wavelength filter 44 can be controlled by exchanging the band-pass filter.

The computer 200 receives an image signal detected by the image sensor 80, performs an image process for the image signal, and displays a two-dimensional image of the test object 60 on a display unit 21 such as a monitor. In addition, the computer 200 performs a Fourier transform for the image signal, and calculates a spatial frequency component. The calculation or the like performed by the computer 200 will be described later with reference to FIG. 2.

In FIG. 1, light emitted from the illumination light source 30 is denoted by dotted lines. The light LW11 emitted from the illumination light source 30 is converted into parallel light LW12 by the first condenser lens 41. The light LW12 has a specified wavelength range through transmission of the wavelength filter 44 and is incident to the first spatial light modulation device 90. Light LW13 having passed through the illumination region 91 of the first spatial light modulation device 90 becomes light LW14 through transmission of the second condenser lens 42, and then travels to the stage 50. Light LW15 having passed through the stage 50 becomes light LW16 through transmission of the imaging optical system 70, and forms an image of the test object 60 on the image sensor 80.

<Configuration of Computer 200>

Figure 2:
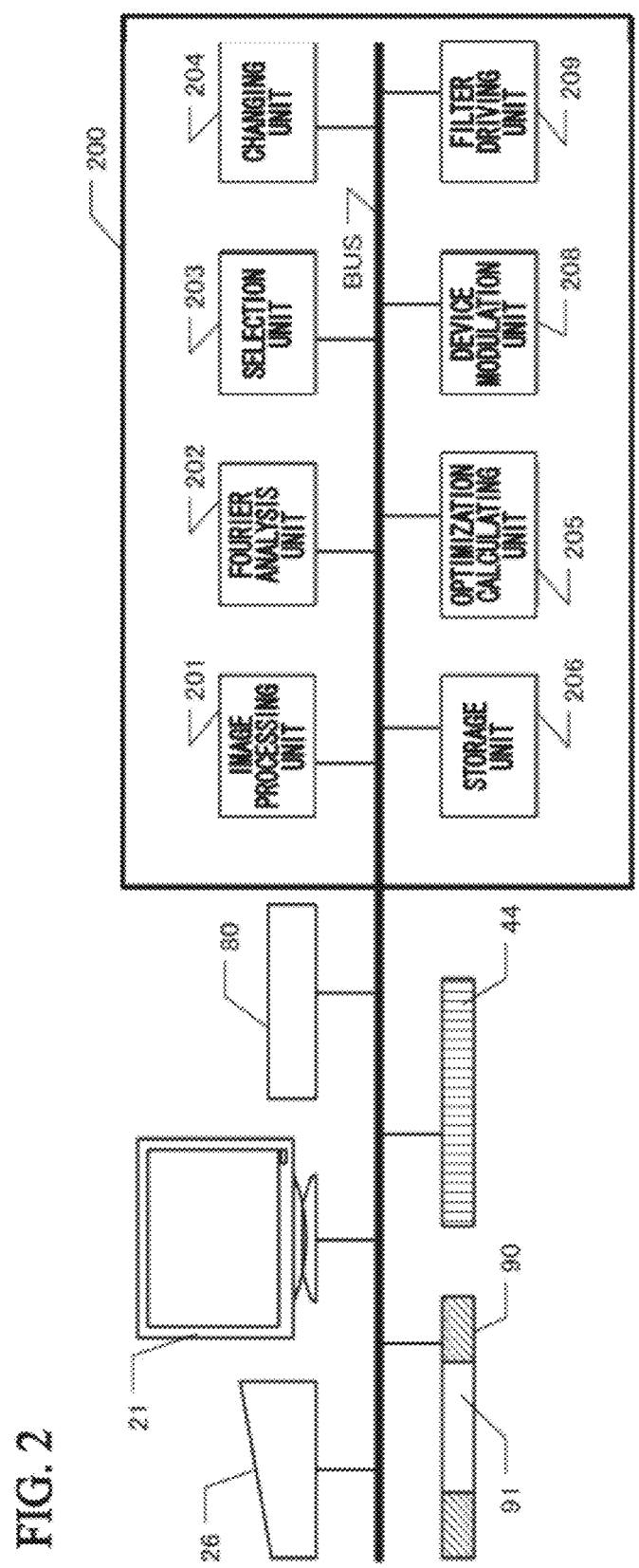
FIG. 2 is a schematic configuration diagram of a computer in the first embodiment.

FIG. 2 is a conceptual diagram illustrating a configuration of the computer 200. The computer 200 includes an image processing unit 201, a Fourier analysis unit 202, a selection unit 203, a changing unit 204, an optimization calculating unit 205, a storage unit 206, a device modulation unit 208, and a filter driving unit 209. The computer 200 is connected to the display unit 21 and an input unit 26 such as a keyboard. They can communicate with each other via a bus line BUS or the like.

The image processing unit 201 and the Fourier analysis unit 202 receive an image signal from the image sensor 80. The image processing unit 201 performs an image process for the image signal from the image sensor 80 so as to be displayed on the display unit 21. The image signal having undergone the image process is sent to the display unit 21, and thus the display unit 21 displays an image of the test object. The image signal having undergone the image process is also sent to the storage unit 206. The Fourier analysis unit 202 performs the Fourier transform for the image signal from the image sensor 80. In addition, the Fourier analysis unit 202 analyzes a Fourier transform value (spatial frequency component) of the test object 60. The Fourier transform value is sent to the optimization calculating unit 205 and is also sent to the storage unit 206 to be stored.

The selection unit 203 specifies an observer's preference. For example, two or more images where the intensity distribution of illumination light is changed or wavelength filters are changed for the same test object 60 are displayed on the display unit 21. In addition, the observer specifies a preferred image using the input unit 26. The changing unit 204 changes a coefficient α of an evaluation function Q(f) described later based on a result from the selection unit 203.

The optimization calculating unit 205 acquires an evaluation regarding the image of the test object 60 as a numerical value using the Fourier transform value of the test object 60 analyzed by the Fourier analysis unit 202 and the evaluation function Q(f) stored in the storage unit 206 in advance. The storage unit 206 stores the image signal sent from the image processing unit 201 and also stores the evaluation function Q(f). In addition, the storage unit 206 stores the Fourier transform value of the test object 60.

The optimization calculating unit 205 sends data regarding the intensity distribution of illumination light or an appropriate wavelength of illumination light to the device modulation unit 208 or the filter driving unit 209 based on a result of the evaluation function Q(f). The device modulation unit 208 changes the size or the shape of the illumination region 91 of the first spatial light modulation device 90 based on the intensity distribution of illumination light. In addition, the filter driving unit 209 changes a wavelength range which is transmitted through the wavelength filter 44 based on the data regarding the wavelength of illumination light.

<Evaluation Function Q(f):First Example>

Figure 3:
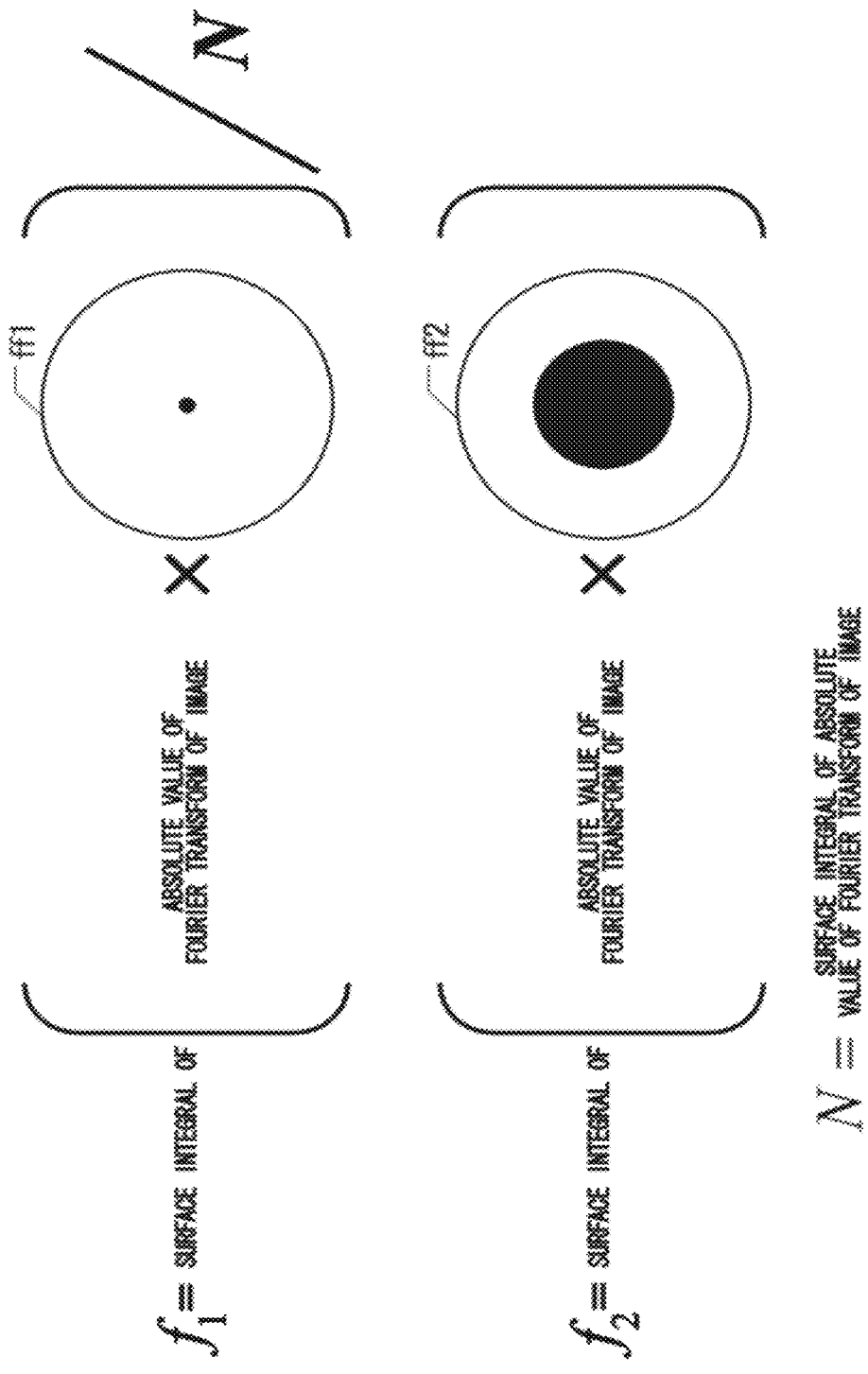
FIG. 3 is a diagram illustrating an evaluation function Q(f) stored in a storage unit according to a first example and a concept thereof in the first embodiment.

FIG. 3 shows a first example of the evaluation function Q(f) stored in the storage unit 206. In FIG. 3, for example, the evaluation function Q(f) includes an equation including a Fourier transform value and is exemplified as following Expression 1.

$$Q(f) = \alpha_1 \times f_1 + \alpha_2 \times f_2 \qquad (1)$$

where $\alpha_1$ and $\alpha_2$ are coefficients, and $f_1$ and $f_2$ are variables (functions).

The variables $f_1$ and $f_2$ are, for example, variables which are obtained by normalizing a value which is obtained by multiplying the Fourier transform value FT of the image of the test object by filters ff (ff1 and ff2). The Fourier transform value FT as an image feature amount may be the absolute value of a spatial frequency component which is obtained through the Fourier transform or may be a value which is the square of a spatial frequency component obtained through the Fourier transform. FIG. 3 shows the variables $f_1$ and $f_2$ using the absolute value of the Fourier transform.

The filters ff (ff1 and ff2) are filters which remove a DC component or a low frequency component of an image. FIG. 3 shows schematic filters ff. Here, the black region indicates removal of an image component. The filter ff1 removes a DC component of the image signal of the test object 60, and the filter ff2 removes a DC component and a low frequency component of the image signal of the test object 60. The filter ff1 and the filter ff2 are different from each other in terms of how much they emphasize the high frequency component of the image signal. Other filters ff as well as the filters ff shown in FIG. 3 may be used.

The variables $f_1$ and $f_2$ are obtained by dividing surface integrals of values obtained by multiplying the Fourier transform value FT as an image feature amount by the filters ff, by a surface integral N of the Fourier transform value FT. With this, the variables $f_1$ and $f_2$ are normalized. The evaluation function Q(f) is obtained by multiplying the variables $f_1$ and $f_2$ by the coefficients $\alpha_1$ and $\alpha_2$. The coefficients $\alpha_1$ and $\alpha_2$ are changed by the changing unit 204 shown in FIG. 2. For example, the coefficient $\alpha_1=1$ and $\alpha_2=2$.

The evaluation function Q(f) according to the present embodiment is an example using the two variables $f_1$ and $f_2$. However, the present invention is not limited thereto, and another filter ff may be further prepared, and a calculation may be performed based on an evaluation function using three variables.

<Operation of Microscope System 100>

Figure 4:
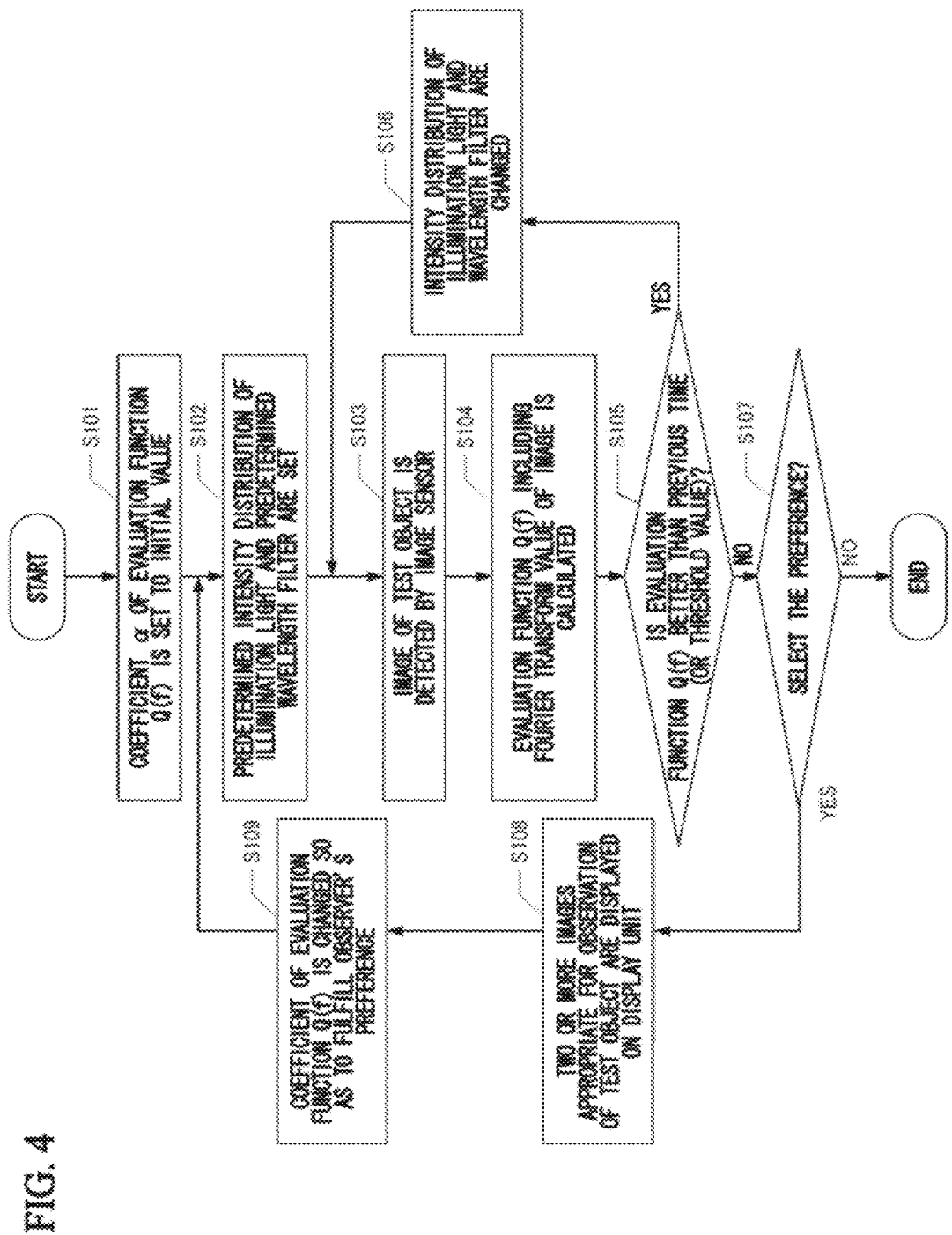
FIG. 4 shows an example of the flowchart illustrating an operation of the microscope system in the first embodiment.

FIG. 4 shows an example of the flowchart illustrating an operation of the microscope system 100.

In step S101, the coefficient $\alpha$ of the evaluation function Q(f) is set to an initial value. The initial value is set such that an image where an image of the test object 60 is universally preferred has a high value in an evaluation function. For example, the coefficients $\alpha_1$ and $\alpha_2$ shown in FIG. 3 are set to $\alpha_1=1$ and $\alpha_2=1$.

In step S102, the illumination region 91 of the first spatial light modulation device 90 is set to a predetermined intensity distribution of illumination light. For example, the illumination region 91 of the first spatial light modulation device 90 has an entirely open shape. In addition, the wavelength filter 44 is set to a predetermined wavelength filter. The wavelength filter 44 is a wavelength filter which transmits visible light of, for example, 400 nm to 800 nm, therethrough.

In step S103, an image signal of the test object 60 is detected by the image sensor 80 at the intensity distribution of illumination light or the wavelength filter set in step S102. In addition, the detected two-dimensional image is processed by the image processing unit 201 and is displayed on the display unit 21. In addition, the observer may select a partial region of the test object 60 from the two-dimensional image displayed on the display unit 21. The partial region may be one place or two or more places of the test object 60. The observer moves a region of the test object 60 which is desired to be observed to the center, and thus the central region of the image sensor 80 may be automatically selected as the partial region. The partial region may be set by the observer or may be set automatically.

In step S104, the Fourier analysis unit 202 performs the Fourier transform for the detected image signal, and the optimization calculating unit 205 calculates an evaluation function Q(f) having the variables $f_1$ and $f_2$ including the Fourier transform value FT as an image feature amount. When the partial region is selected, the Fourier analysis unit 202 may analyze an image signal of the selected partial region of the test object 60.

In step S105, the optimization calculating unit 205 determines whether or not the value of the calculated evaluation function Q(f) is better than a threshold value or the value of a previous evaluation function Q(f). In the first embodiment, the optimization calculating unit 205 calculates the intensity distribution of illumination light or optimization of a wavelength filter using a hill-climbing method. In the initial calculation, a value of the evaluation function Q(f) is compared with the threshold value, and, in the second calculation and thereafter, a value of the evaluation function Q(f) is compared with a value of the previously calculated evaluation function Q(f). If a value of this evaluation function Q(f) is good (YES), the flow proceeds to step S106, and if the value of the evaluation function Q(f) is bad (NO), the flow proceeds to step S107.

In step S106, the device modulation unit 208 slightly changes the intensity distribution of illumination light of the first spatial light modulation device 90. Alternatively, the filter driving unit 209 changes the wavelength filter 44 to a wavelength filter which transmits a different wavelength range. Then, the flow proceeds to step S103. Steps S103 to S106 are repeated until the value of the evaluation function Q(f) becomes worse than the value of the previous iteration. The value of the evaluation function Q(f) being worse than the value of the previous iteration means that the value of the previous evaluation function Q(f) is assumed to be the best.

In step S107, it is determined whether or not the observer selects a preference. An image of the test object 60 which corresponds to the best value of the evaluation function Q(f) obtained in step S105 is displayed on the display unit 21. In addition, the selection unit 203 displays a button for selecting the preference so as to be adjacent to the image of the test object 60 on the display unit 21. If the image of the test object 60 displayed on the display unit 21 is suitable for the observer's preference (NO), the best image obtained in step S105 is displayed and then the flow finishes. If the observer clicks the button for selecting a preference (YES), the flow proceeds to step S108.

In step S108, the selection unit 203 displays two or more images which are appropriate for observation of the test object 60 on the display unit 21. For example, the selection unit 203 displays the image of the test object 60 where a value of the evaluation function Q(f) is the highest according to the hill-climbing method, but displays a plurality of images where the value is not the highest.

Figure 5:
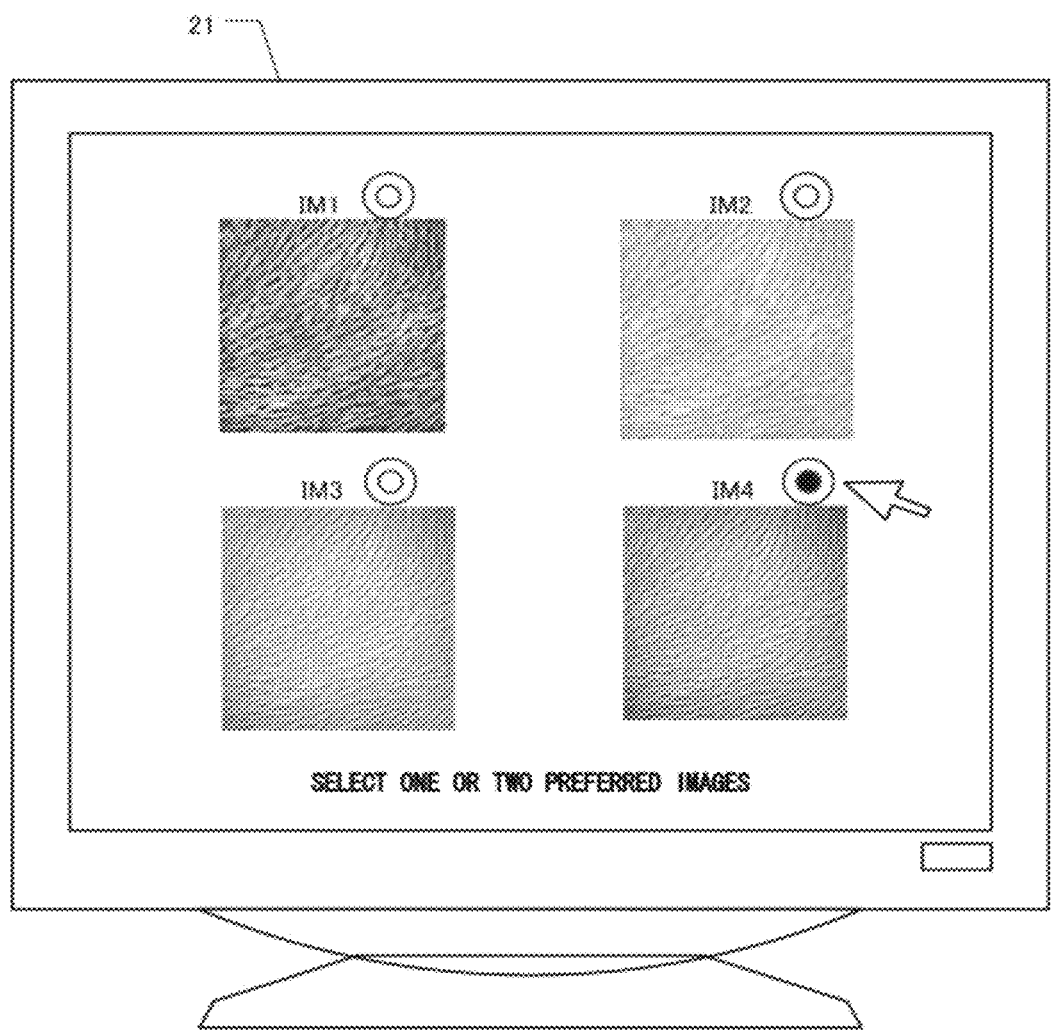
FIG. 5 shows an example where the selection unit displays a plurality of test object images on a display unit in the first embodiment.

FIG. 5 shows an example where four images (IM1 to IM4) of the test object 60 are displayed on the display unit 21. It is assumed that an image where the value of the evaluation function Q(f) obtained by the optimization calculating unit 205 is the highest is the image IM3. In addition, the image IM1 and the image IM2 which are obtained during the repetition of steps S103 to S106 are displayed on the display unit 21, and the image IM4 which is determined as being worse than the value of the evaluation function Q(f) of the image IM3 is displayed. The observer selects one or two images of the four images (IM1 to IM4) displayed on the display unit 21, using the input unit 26. FIG. 5 shows an example where the image IM4 is selected.

In step S109, the changing unit 204 changes the coefficients $\alpha_1$ and $\alpha_2$ such that a value of the evaluation function Q(f) of the selected image IM4 is the best value. For example, although $\alpha_1=1$ and $\alpha_2=1$ in the evaluation function Q(f) hitherto, they are changed to $\alpha_1=3$ and $\alpha_2=2$. In addition, the steps from step S102 to S107 are repeated again. If the calculation is performed again using the hill-climbing method with the evaluation function Q(f) where the coefficient $\alpha$ is changed, the same image as the selected image IM4 may have the best value of the evaluation function Q(f), or an image different from the image IM4 may have it. In any case, it becomes close to an image of the test object 60 where the observer's preference is emphasized.

As described above, when the test object 60 is observed, the microscope system 100 according to the first embodiment changes the evaluation function Q(f) including the Fourier transform value (spatial frequency component) which is an image feature amount, according to an observer's preference. In addition, the intensity distribution of illumination light or a wavelength filter is selected such that the evaluation function Q(f) has the best value. Therefore, the microscope system 100 can obtain an image of the test object 60 according to an observer's preference.

The processes of the flowchart shown in FIG. 4 may be stored in a storage medium as a program. Further, the program stored in the storage medium is installed on a computer, thereby enabling the computer to perform calculation or the like.

(Second Embodiment)

Although the microscope system 100 having the bright-field microscope has been described in the first embodiment, a microscope system 300 having a phase contrast microscope will be described in the second embodiment.

<Microscope System 300>

Figure 6:
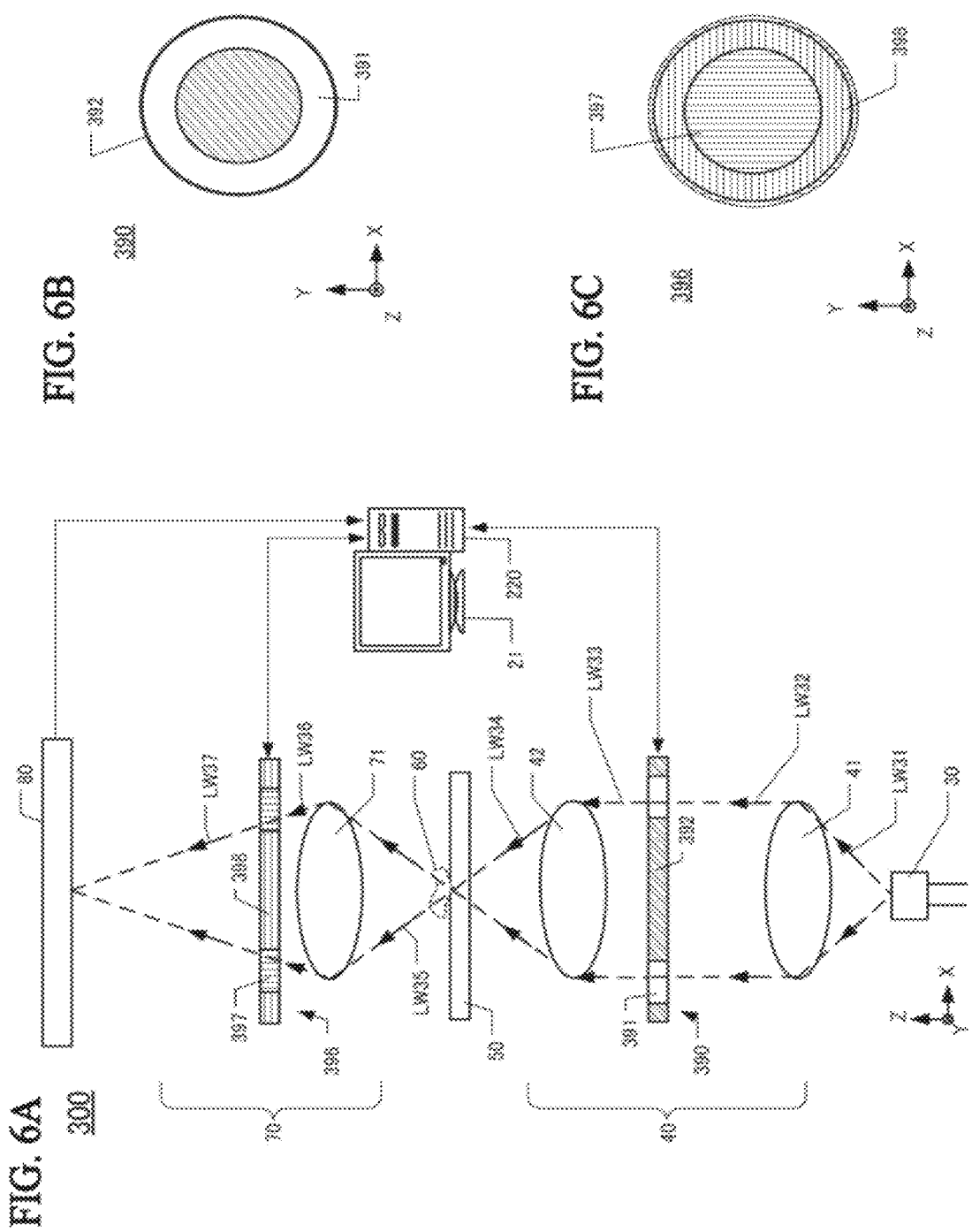
FIG. 6A is a schematic configuration diagram of a microscope system in the second embodiment.
FIG. 6B is a plan view of a first spatial light modulation device in the second embodiment.
FIG. 6C is a plan view of a second spatial light modulation device in the second embodiment.

FIG. 6A is a schematic configuration diagram of the microscope system 300. The microscope system 300 mainly includes an illumination light source 30, an illumination optical system 40, an imaging optical system 70, and an image sensor 80. The microscope system 300 is connected to a computer 220. The illumination optical system 40 includes a first condenser lens 41, a first spatial light modulation device 390, and a second condenser lens 42, and the imaging optical system 70 includes an objective lens 71 and a second spatial light modulation device 396. In addition, a stage 50 is disposed between the illumination optical system 40 and the imaging optical system 70, and a test object 60 is placed on the stage 50.

The second spatial light modulation device 396 is disposed at a position of the pupil of the imaging optical system 70 or in the vicinity around it. In addition, the first spatial light modulation device 390 is disposed at a position forming a conjugate with respect to a position of the pupil of the imaging optical system 70 inside the illumination optical system 40. The first spatial light modulation device 390 is constituted by a liquid crystal panel, a DMD, or the like which can arbitrarily vary the intensity distribution of transmitted light. The second spatial light modulation device 396 is constituted by a liquid crystal panel or the like which can change phases. In addition, the second spatial light modulation device preferably has such a configuration that intensity distributions of light as well as phases can be freely changed.

In FIG. 6A, light emitted from the illumination light source 30 is denoted by dotted lines. The light LW31 emitted from the illumination light source 30 is converted into light LW32 by the first condenser lens 41. The light LW32 is incident to the first spatial light modulation device 390. Light LW33 having passed through the first spatial light modulation device 390 becomes light LW34 through transmission of the second condenser lens 42, and then travels to the test object 60. Light LW35 having passed through the test object 60 becomes light LW36 through transmission of the objective lens 71, and is incident to the second spatial light modulation device 396. The light LW36 becomes light LW37 through transmission of the second spatial light modulation device 396 and then forms an image on the image sensor 80. An image signal of the image formed on the image sensor 80 is sent to the computer 220. Further, the computer 220 analyzes a Fourier transform value (spatial frequency component) of the test object 60 based on the image obtained from the image sensor 80. In addition, an illumination shape appropriate for observation of the test object 60 is sent to the first spatial light modulation device 390 and the second spatial light modulation device 396.

FIG. 6B is a plan view of the first spatial light modulation device 390. The first spatial light modulation device 390 is provided with a ring-shaped transmission region (illumination region) 391 of light, and a region other than the transmission region 391 forms a light shielding region 392.

FIG. 6C is a plan view of the second spatial light modulation device 396. The second spatial light modulation device 396 is provided with a ring-shaped phase modulation region 397, and a phase of light transmitted through the phase modulation region 397 is misaligned by ¼ wavelength. A phase of light transmitted through a diffracted light transmission region 398 which is a region other than the phase modulation region 397 is not misaligned. The phase modulation region 397 is formed so as to become a conjugate with the transmission region 391 of the first spatial light modulation device 390.

0th order light (transmitted light) of the microscope system 300 is transmitted through the transmission region 391 of the first spatial light modulation device 390, is then transmitted through the phase modulation region 397 of the second spatial light modulation device 396, and then reaches the image sensor 80. In addition, diffracted light emitted from the test object 60 is transmitted through the diffracted light transmission region 398 of the second spatial light modulation device 396, and then reaches the image sensor 80. In addition, the 0th order light and the diffracted light form an image on the image sensor 80. Generally, the 0th order light has larger intensity than the diffracted light, and thus light intensity of the phase modulation region 397 is preferably adjusted.

In the first spatial light modulation device 390 and the second spatial light modulation device 396, sizes and shapes of the transmission region 391 and the phase modulation region 397 can be freely changed. In addition, as described in the first embodiment, an illumination shape stored in the storage unit may be derived, and the shape of the transmission region 391 of the first spatial light modulation device 390 may be optimized. The ring-shaped region 397 of the second spatial light modulation device 396 is formed so as to become a conjugate with the transmission region 391 of the first spatial light modulation device 390 at all times. For this reason, the shapes of the transmission region 391 and the ring-shaped region 397 are preferably varied in synchronization with each other.

<Configuration of Computer 220>

Figure 7:
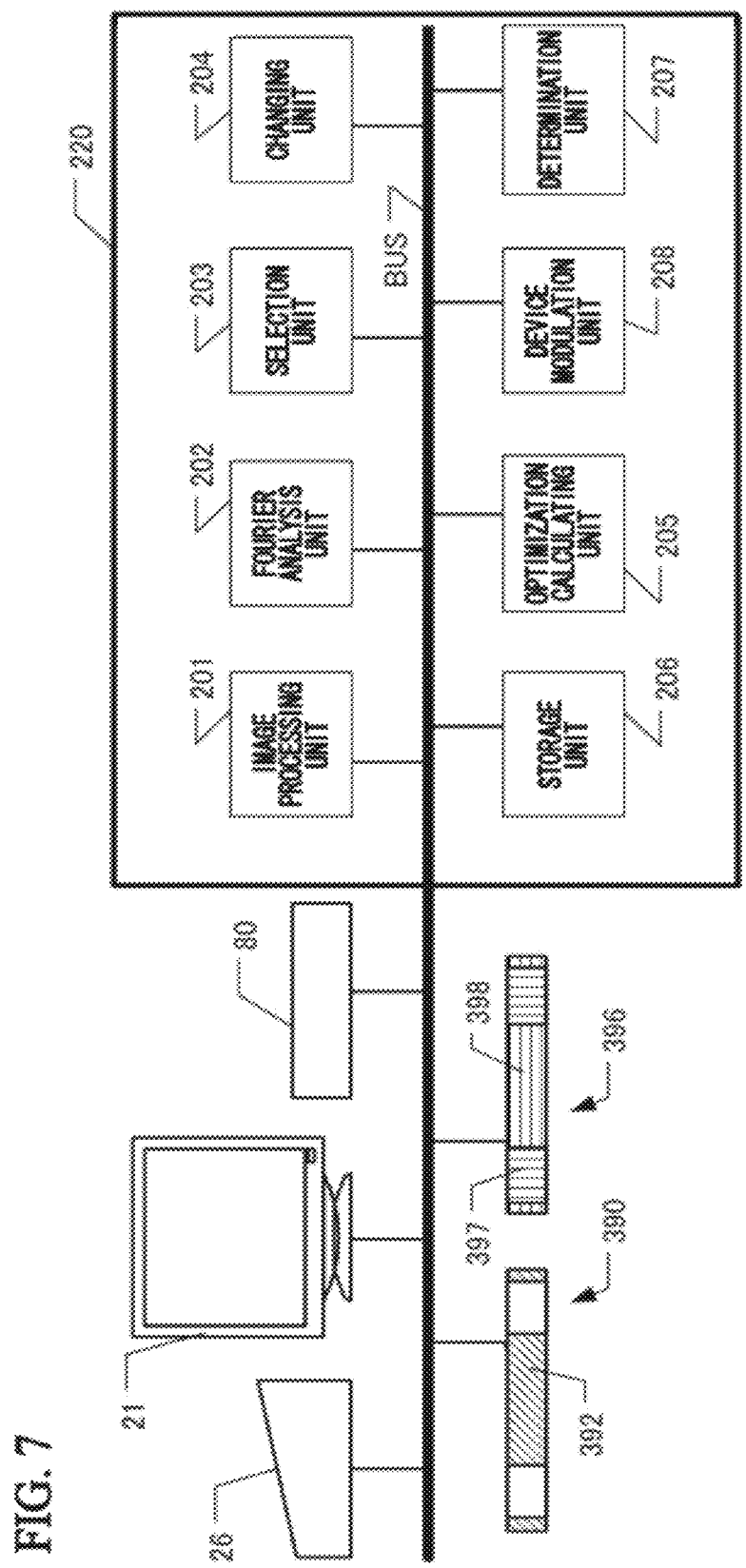
FIG. 7 is a schematic configuration diagram of a computer in the second embodiment.

FIG. 7 is a conceptual diagram illustrating a configuration of the computer 220. The computer 220 is basically the same as the computer 200 shown in FIG. 3, and is different from the computer 200 in that it newly includes a determination unit 207 but, on the other hand, does not include the filter driving unit 209. In addition, the computer 220 is different from the computer 200 in that one device modulation unit 208 is connected to the first spatial light modulation device 390 and the second spatial light modulation device 396. Hereinafter, differences with the computer 200 will be mainly described.

The determination unit 207 receives an image signal from the image sensor 80. In addition, the determination unit 207 determines whether the test object 60 is a phase object or an absorption object based on a signal related to contrast of the image. The phase object refers to a colorless transparent object which does not change light intensity and changes only a phase in transmitted light. The absorption object is also called a light absorbing object or an intensity object, and is a color object which changes the intensity of transmitted light.

The determination unit 207 determines the phase object and the absorption object based on an image of the test object 60 which is captured under the two following conditions. In the first condition, the image sensor 80 detects the test object 60 in a state where the transmission region 391 is circular without the light shielding region 392 in the first spatial light modulation device 390, and the entire surface does not have phase contrast without the phase modulation region 397 in the second spatial light modulation device 396. In the second condition, the image sensor 80 detects the test object 60 in a state where the transmission region 391 has a ring shape in the first spatial light modulation device 390, and the phase modulation region 397 has a ring shape and has phase contrast of ¼ wavelength in the second spatial light modulation device 396.

The determination unit 207 determines whether or not contrast of the image of the test object 60 captured in the first condition is higher than a threshold value, and determines whether or not contrast of the image of the test object 60 captured in the second condition is higher than a threshold value. For example, if the test object 60 is a phase object, contrast of an image of the test object 60 captured in the first condition is low, and contrast of an image of the test object 60 captured in the second condition is high. In contrast, if the test object 60 is an absorption object, contrast of an image of the test object 60 captured in the first condition is high, and contrast of an image of the test object 60 captured in the second condition is low. As such, the determination unit 207 determines whether the test object 60 is a phase object or an absorption object. The result determined by the determination unit 207 is sent to the optimization calculating unit 205.

The optimization calculating unit 205 uses the result sent from the determination unit 207 when comparing the Fourier transform value of the test object 60 with a Fourier transform value stored in the storage unit 206.

The device modulation unit 208 changes the size or shape of the illumination region 391 of the first spatial light modulation device 390 based on the appropriate intensity distribution of illumination light. In addition, the device modulation unit 208 changes the size or shape of the phase modulation region 397 of the second spatial light modulation device 396 based on the appropriate intensity distribution of illumination light.

Evaluation Function Q(f):Second Example>

Figure 8:
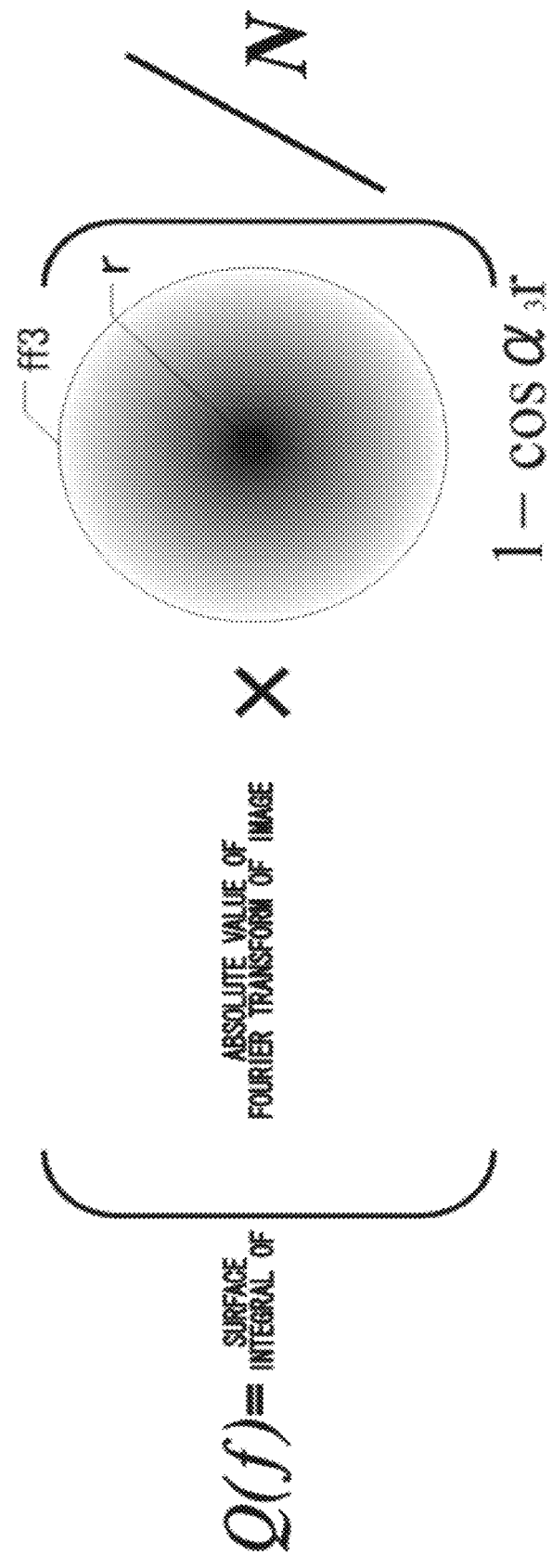
FIG. 8 is a diagram illustrating an evaluation function Q(f) stored in the storage unit according to a second example and a concept thereof in the second embodiment.

FIG. 8 is a second example of the evaluation function Q(f) stored in the storage unit 206. In FIG. 8, for example, the evaluation function Q(f) has a Fourier transform value (spatial frequency component) FT as a variable and is exemplified as following Expression 2.

$$Q(f) = FT \times \text{surface integrals of } (1 - \cos(\alpha_3 r))/N \quad (2)$$

where $\alpha_3$ is a coefficient and r is a radius.

The evaluation function Q(f) is a numerical value which is obtained by normalizing a value which is obtained by multiplying the Fourier transform value FT of the image of the test object by a filter ff3. The Fourier transform value FT as an image feature amount may be the absolute value of a spatial frequency component which is obtained through the Fourier transform or may be a value which is the square of a spatial frequency component obtained through the Fourier transform. FIG. 8 shows the absolute value of the Fourier transform.

The filter ff3 is a filter removes a DC component and a low frequency component of the image signal in the same manner as the first embodiment. FIG. 8 schematically shows the filter ff3. Here, the black region indicates removal of the image signal. The filter ff3 removes a DC component of the image signal of the test object 60, and also decreases a rate removing the image signal according to an increase in frequency. The filter ff3 uses the image signal of a high frequency. By changing the magnitude of the coefficient $\alpha_3$, a ratio removing the image signal is changed according to an increase in the frequency. In the evaluation function Q(f) shown in FIG. 3, $\alpha_3$ is in a range of $0 < \alpha_3 < 1$, and, for example, $\alpha_3 = 0.7$ in FIG. 8.

The evaluation function Q(f) is obtained by dividing a surface integral of a value obtained by multiplying the Fourier transform value FT as an image feature amount by the filter ff3, by a surface integral N of the Fourier transform value FT. With this, the evaluation function Q(f) is normalized, and the evaluation function Q(f) according to the second embodiment lies between 0 and 1.

Although the evaluation function Q(f) according to the second embodiment uses the cosine function, the present invention is not limited thereto, and may prepare for a filter ff related to other equations.

<Operation of Microscope System 300>

Figure 9:
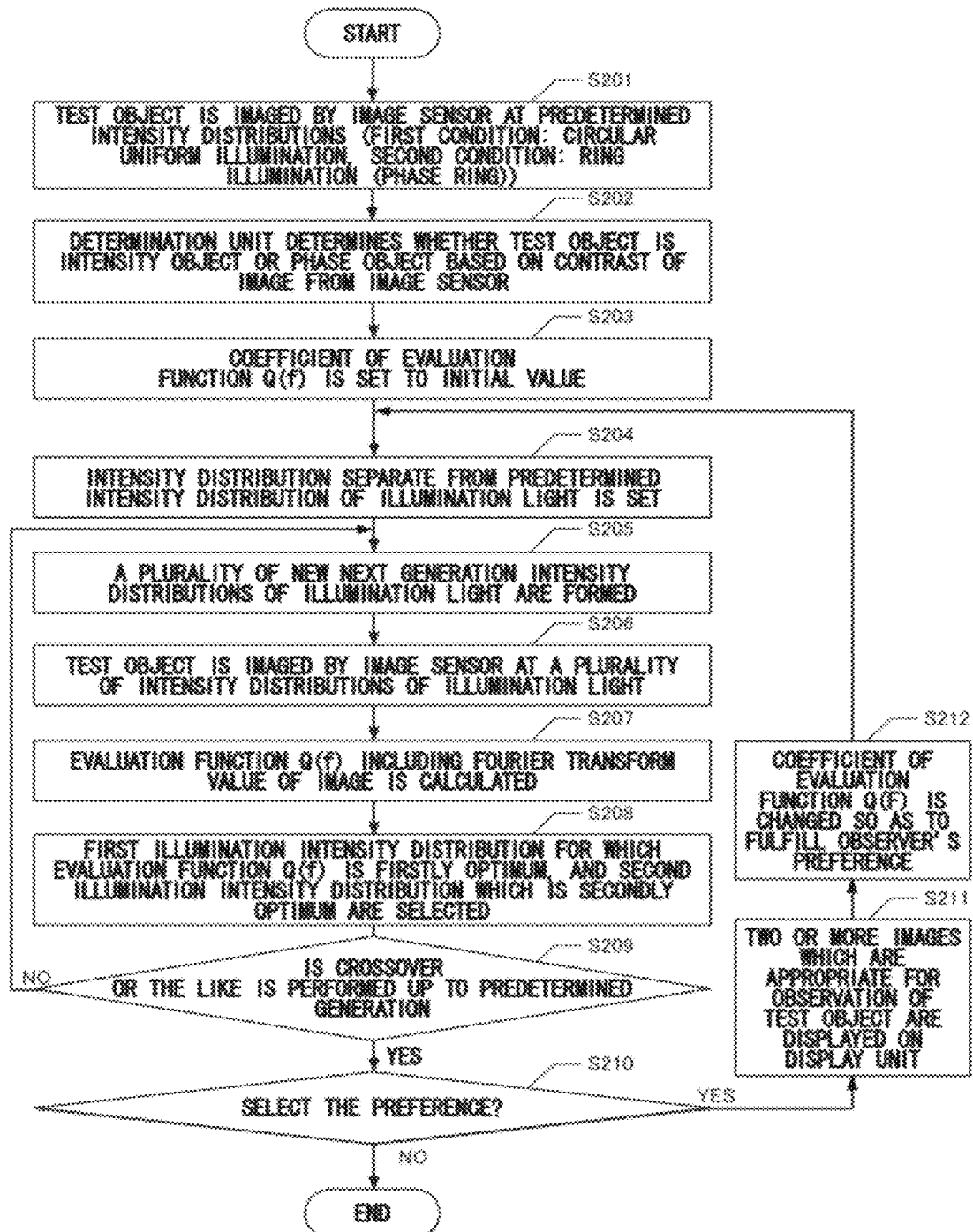
FIG. 9 shows an example of the flowchart illustrating an operation of the microscope system in the second embodiment.

FIG. 9 shows an example of the flowchart illustrating an operation of the microscope system 300.

In step S201, the first spatial light modulation device 390 and the second spatial light modulation device 396 are modulated to have two predetermined intensity distributions (first condition: circular uniform illumination, second condition: ring illumination (phase ring)). The test object 60 is imaged by the image sensor 80 in the respective conditions.

In step S202, the determination unit 207 determines whether the test object 60 is an absorption object or a phase object based on the contrast of the image of the test object 60. For example, if the test object 60 is a phase object, contrast of an image of the test object 60 captured in the first condition is low, and contrast of an image of the test object 60 captured in the second condition is high. In this flowchart, a description will be made on the premise that the determination unit 207 determines that the test object 60 is a phase object.

In step S203, the coefficient $\alpha_3$ of the evaluation function Q(f) is set to an initial value. The initial value is set such that an image where an image of the test object 60 is universally preferred has a high value in an evaluation function. For example, the coefficient $\alpha_3$ shown in FIG. 8 is set to $\alpha_1$=0.8.

Figure 10A:
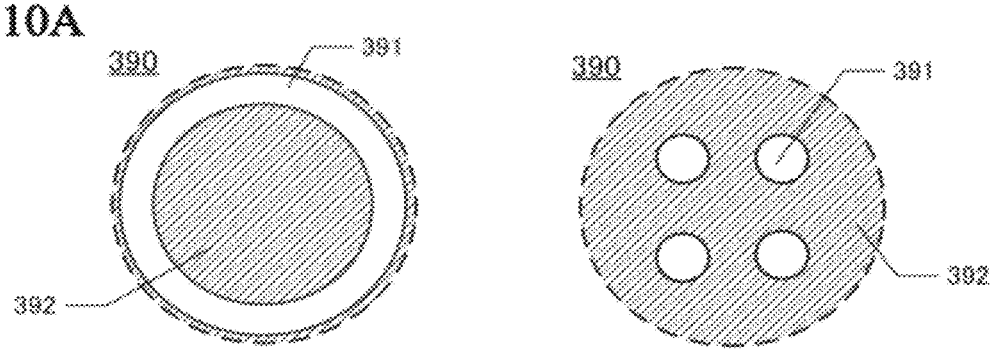
FIG. 10A shows an example of the transmission region of the first spatial light modulation device which is obtained by a genetic algorithm, in the second embodiment.

In step S204, since the test object 60 is a phase object in step S202, the transmission region 391 of the first spatial light modulation device 390 and the phase modulation region 397 of the second spatial light modulation device 396 are set for the phase object. In the second embodiment, the optimization calculating unit 205 calculates the intensity distribution of illumination light or optimization of a wavelength filter using the genetic algorithm. For this reason, two intensity distributions of illumination light of current generation are initially prepared. For example, as shown in FIG. 10A, in one intensity distribution, the illumination region 391 and the phase modulation region 397 have a wide ring shape, and the other intensity distribution has a shape where four small openings are uniformly disposed from the center.

In step S205, the optimization calculating unit 205 forms a plurality of intensity distributions of illumination light of the next generation according to a crossover or mutation method of the genetic algorithm.

In step S206, an image of the test object 60 is detected by the image sensor 80 using the plurality of intensity distributions of illumination light of the next generation. In addition, the detected two-dimensional image is processed by the image processing unit 201 and is displayed on the display unit 21. Further, the observer may select a partial region of the test object 60 from the two-dimensional image displayed on the display unit 21. The partial region may be one place or two or more places of the test object 60. The observer moves a region of the test object 60 which is desired to be observed to the center, and thus the central region of the image sensor 80 may be automatically selected as the partial region. The partial region may be set by the observer or may be set automatically.

In step S207, the Fourier analysis unit 202 performs the Fourier transform for image signals of the plurality of intensity distributions of illumination light, and the optimization calculating unit 205 calculates an evaluation function Q(f) including the Fourier transform value FT as an image feature amount for each of the plurality of intensity distributions of illumination light. When the partial region is selected, the Fourier analysis unit 202 may analyze an image signal of the selected partial region of the test object 60.

Figure 10B:
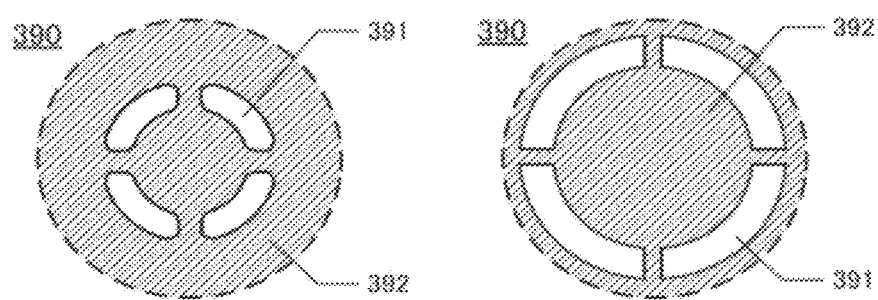
FIG. 10B shows an example of the transmission region of the first spatial light modulation device which is obtained by a genetic algorithm, in the second embodiment.

In step S208, the optimization calculating unit 205 compares values of the evaluation function Q(f) of the image of the test object 60 obtained in step S207, and, among them, selects a first illumination light intensity distribution which is the intensity distribution of illumination light having the best value of the evaluation function Q(f), and a second illumination light intensity distribution which is the intensity distribution of illumination light having the second best value of the evaluation function Q(f). The selected first and second illumination light intensity distributions have, for example, a shape of the transmission region 391 as shown in FIG. 10B.

In step S209, it is determined whether or not a crossover or a mutation is performed up to a predetermined generation, for example, the 1000th generation. If the crossover or the like is not performed up to the predetermined generation, the flow returns to step S205. In addition, in step S205, illumination intensity distributions having a higher evaluation function Q(f) are searched based on the first and second illumination light intensity distributions selected in step S208. If the crossover or the like is performed up to the predetermined generation, the flow proceeds to step S210.

In step S210, it is determined whether or not the observer selects a preference. For example, an image of the test object 60 which corresponds to the best value of the evaluation function Q(f) obtained in step S208 is displayed on the display unit 21. In addition, the selection unit 203 displays a button for selecting the preference so as to be adjacent to the image of the test object 60 on the display unit 21. If the observer is satisfied with the image displayed on the display unit 21, the best image obtained in step S208 is displayed and then the flow finishes. If the observer clicks the button for selecting a preference, the flow proceeds to step S211.

In step S211, the selection unit 203 displays two or more images which are appropriate for observation of the test object 60 on the display unit 21. For example, the selection unit 203 displays four images in an order that values of the evaluation function Q(f) obtained according to the genetic algorithm are high. The observer selects one or two images of four images displayed on the display unit 21 using the input unit 26.

In step S212, the changing unit 204 changes the coefficient $\alpha_3$ such that the value of the evaluation function Q(f) of the selected image is the best value. For example, although $\alpha_3$=0.8 in the evaluation function Q(f) hitherto, it is changed to $\alpha_3$=0.7. In addition, the steps from step S204 to S209 are repeated again.

As described above, when the test object 60 is observed, the microscope system 300 according to the second embodiment changes the evaluation function Q(f) including the Fourier transform value (spatial frequency component) which is an image feature amount, according to an observer's preference. In addition, the intensity distribution of illumination light is selected such that the evaluation function Q(f) has the best value. Therefore, the microscope system 300 can obtain an image of the test object 60 according to an observer's preference.

The processes of the flowchart shown in FIG. 9 may be stored in a storage medium as a program. Further, the program stored in the storage medium is installed in a computer, thereby enabling the computer to perform a calculation or the like.

(Third Embodiment)

In the first embodiment, the evaluation function Q(f) is applied in the hill-climbing method, an image obtained through the hill-climbing method is displayed, and then an observer's preference is specified. In the same manner, in the second embodiment, the evaluation function Q(f) is applied in the genetic algorithm, an image obtained through the genetic algorithm is displayed, and then an observer's preference is specified. In the third embodiment, an observer's preference is specified before optimization is calculated in the hill-climbing method or the genetic algorithm.

Figure 11:
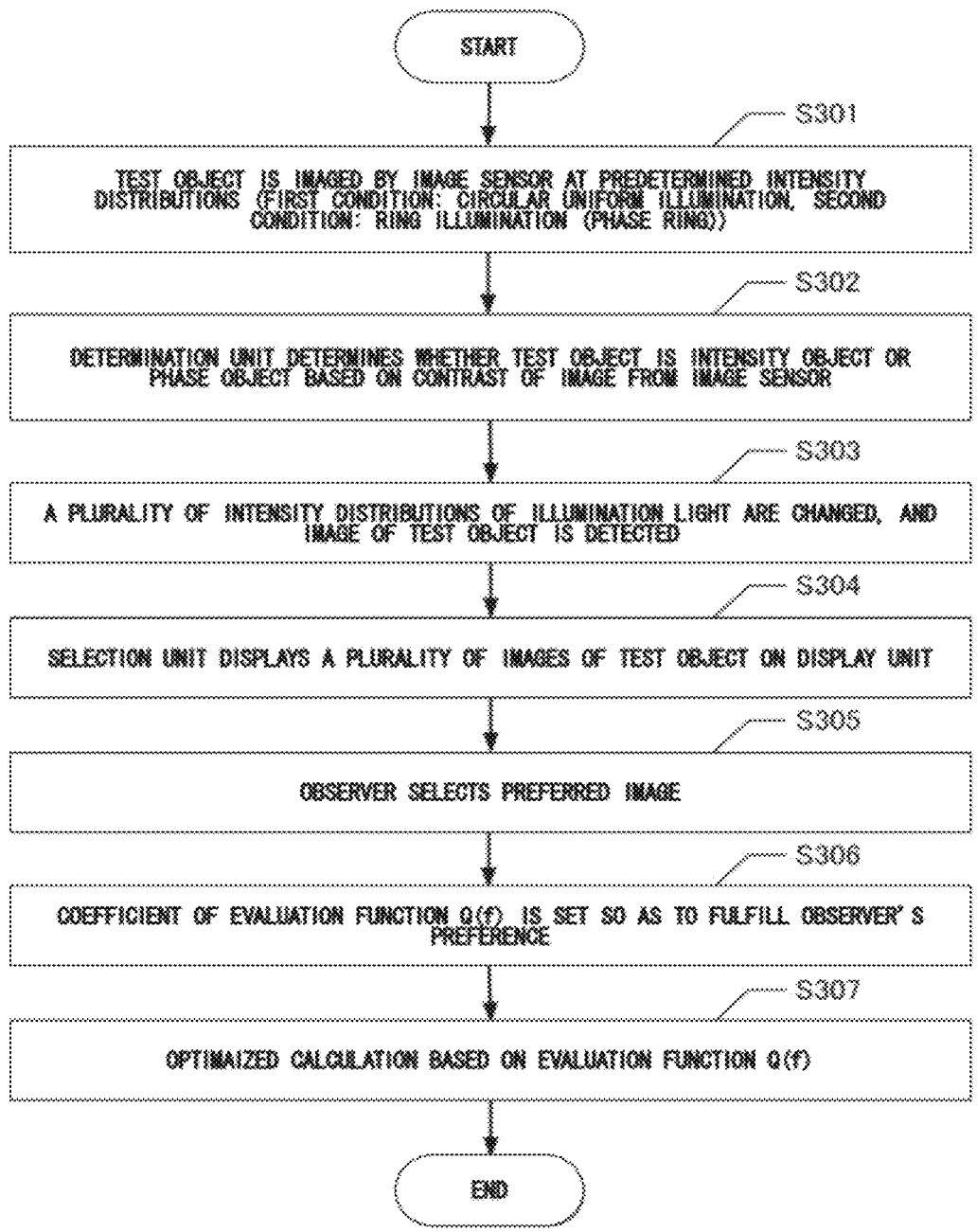
FIG. 11 is a flowchart for specifying an observer's preference before optimization calculation.

FIG. 11 is a flowchart for specifying an observer's preference before calculating optimization. In addition, FIGS. 12A, 12B, 12C and 12D are diagrams illustrating an example of the intensity distribution of illumination light for observing the test object 60 before calculating optimization and a spatial frequency component when the Fourier transform is performed. It can be applied to both the first embodiment and the second embodiment, and an example of being applied to the second embodiment will be described in the following.

In step S301, the first spatial light modulation device 390 and the second spatial light modulation device 396 are modulated to have two predetermined intensity distributions (first condition: circular uniform illumination, second condition: ring illumination (phase ring)). The test object 60 is imaged by the image sensor 80 in the respective conditions. It is the same as step S201 in FIG. 9.

In step S302, the determination unit 207 determines whether the test object 60 is an absorption object or a phase object based contrast of the image of the test object 60. It is the same as step S202 in FIG. 9.

In step S303, a plurality of intensity distributions of illumination light are changed, and an image of the test object 60 is detected by the image sensor 80. If the test object 60 is determined as being an absorption object in step S302, for example, the first spatial light modulation devices 390 (Ex1 and Ex2) shown in FIGS. 12A and 12B are used. For example, the first spatial light modulation device 390 (Ex1) has a large transmission region 391, and the first spatial light modulation device 390 (Ex2) has a small transmission region 391. For this reason, contrast or brightness of the images of the test object is different.

In a case of the first spatial light modulation device 390 (Ex1), as shown in the right part of FIG. 12A, intensity (amplitude) of the spatial frequency component (the longitudinal axis: intensity, the transverse axis: frequency) which has undergone the Fourier transform decreases at a specific slope, for example, from the low frequency to the high frequency. In a case of the first spatial light modulation device 390 (Ex2), as shown in the right part of FIG. 12B, for example, the high frequency of the spatial frequency component is emphasized.

If the test object 60 is determined as being a phase object in step S302, for example, the first spatial light modulation devices 390 (Ex3 and Ex4) shown in FIGS. 12C and 12D are used. In a case of the ring shape where the diameter is great the width is small such as the first spatial light modulation device 390 (Ex3), as shown in the right part of FIG. 12C, the spatial frequency component is strengthened from the middle. In a case of the first spatial light modulation device 390 (Ex4) of which the diameter is small and the width is great, as shown in the right part of FIG. 12D, intensity (amplitude) decreases at a specific slope from the low frequency to the high frequency.

In step S304, if the test object is an absorption object, the selection unit displays two images of the test object captured by the first spatial light modulation devices 390 (Ex1 and Ex2) on the display unit 21. If the test object is a phase object, the selection unit displays two images of the test object captured by the first spatial light modulation devices 390 (Ex3 and Ex4) on the display unit 21.

In step S305, the observer selects one of the two images.

In step S306, the changing unit 204 sets the coefficient $\alpha_3$ of evaluation function Q(f) so as to fulfill the observer's preference.

In step S307, optimization is calculated according to the genetic algorithm using the evaluation function Q(f) where the coefficient $\alpha_3$ of a so-called initial value is set to the coefficient $\alpha_3$ in step S306.

The processes of the flowchart shown in FIG. 11 may be stored in a storage medium as a program. Further, the program stored in the storage medium is installed in a computer, thereby enabling the computer to perform calculation or the like.

Although the description has been made from the first embodiment to the third embodiment, various modifications may be further applied thereto. For example, the embodiments may be applied to an imaging apparatus such as a camera which images a landscape or the like in addition to the bright-field microscope and the phase contrast microscope.

For example, in the microscope system 100, the illumination light source 30 applies white illumination light, and the wavelength filter 44 transmits a specific range of the wavelength of the light beam transmitted therethrough. Instead of using the wavelength filter 44, there may be use of the illumination light source 30 which has a plurality of LEDs which apply light of different wavelengths (for example, red, green, and blue). For example, if white light is irradiated toward the test object 60, red, green, and blue LEDs are simultaneously lighted, and if red light is irradiated toward the test object 60, only the red LED is lighted. As such, a wavelength of illumination light may be selected.

Further, in the first embodiment, the example using the hill-climbing method has been shown with reference to FIG. 4. In addition, in the second embodiment, the example using the genetic algorithm has been shown with reference to FIG. 9. In the optimization calculating method includes a Tabu search method, a simulated annealing method, and the like in addition thereto, and the optimization calculating methods may be used. In addition, although the microscope system 300 shown in FIGS. 6A, 6B and 6C does not include a wavelength filter, the wavelength filter may be included. Further, although, in the first and second embodiments, the Fourier transform value (spatial frequency component) has been used as an image feature amount, the present invention is not limited thereto. For example, a histogram (the longitudinal axis: frequency of appearance, the transverse axis: gray scale value) indicating the frequency of appearance of gray scale values may also be used as an image feature amount. Further, contrast or maximal gradient amount of an image may be used as an image feature amount. The maximal gradient amount is the maximal value of luminance value variations in a spatial luminance value profile (the transverse axis: for example, the X direction position, the longitudinal axis: luminance value).

What is claimed is:

1. An imaging apparatus comprising:
an imaging unit that images a test object;
an analysis unit that outputs an image feature amount of a test object image which is captured by the imaging unit under different illumination conditions;
a storage unit that stores an evaluation function which has the image feature amount as a variable, for evaluation of the test object image;
an optimization calculating unit that generates a value for the evaluation functions, the value representing a result of the evaluation of the test object image using the evaluation function;
a selection unit which simultaneously displays a predetermined number of two or more test object images and which selects one test objects image among the displayed images; and
a changing unit that changes the evaluation function based on the one test object image selected by the selection unit,
wherein when a test object image for which a highest value for the evaluation function is obtained by the optimization calculating unit and the selected test object image are different from each other, the changing unit changes the evaluation function so that the value for the evaluation function obtained for the selected test object object images.

2. The imaging apparatus according to claim 1, wherein the evaluation function has a weighting coefficient multiplied by the variable, and
wherein the changing unit changes the weighting coefficient.

3. The imaging apparatus according to claim 1, wherein the imaging unit has an illumination optical system which illuminates the test object, and
wherein the two or more test object images are images which are captured by changing intensity distributions of illumination light which illuminates the test object.

4. The imaging apparatus according to claim 3, further comprising:
a spatial modulation unit that varies intensity distributions of the illumination light,
wherein the optimization calculating unit performs an optimized calculation of the intensity distribution of the illumination light which is appropriate for observation of the test object using the changed evaluation function, and
wherein the imaging unit performs imaging each time the spatial modulation unit varies the intensity distribution of the illumination light, the analysis unit outputs an image feature amount for each captured image, and the optimization calculating unit performs calculation using the changed evaluation function.

5. The imaging apparatus according to claim 1, wherein the imaging unit includes an illumination optical system that illuminates the test object, and
wherein the two or more test object images are images which are captured by changing wavelengths of illumination light which illuminates the test object.

6. The imaging apparatus according to claim 5, further comprising:
a spatial modulation unit that varies the intensity distribution of the illumination light,
wherein the optimization calculating unit performs an optimized calculation of a wavelength of the illumination light which is appropriate for observation of the test object using the changed evaluation function,
wherein the imaging unit performs imaging each time the wavelength is varied, the analysis unit outputs the image feature amount for each captured image, and the optimization calculating unit performs calculation using the changed evaluation function.

7. The imaging unit according to claim 4, further comprising a determination unit that determines whether the test object is an absorption object or a phase object,
wherein the determination unit determines whether the test object is the absorption object or the phase object before the optimization calculating unit performs optimized calculation.

8. The imaging apparatus according claim 1, wherein an image feature amount of the test object comprises a spatial frequency component, a histogram, a contrast, or a maximal gradient, of at least a part of the image of the test object.

9. A non-transitory computer storage medium storing a program for imaging the test object using an imaging apparatus comprising an imaging unit that images the test object and a computer that is connected to the imaging unit, the program enabling the computer to execute:
outputting an image feature amount of a test object image captured by the imaging unit under different illumination conditions;
storing an evaluation function having the image feature amount as a variable for evaluation of the test object image;
calculating a value for the evaluation function, the value representing a result if the evaluation of the test object image using the evaluation function;
simulatenously displaying a predetermined number of two or more test object images;
selecting on test object image among the displayed two of more test object images; and
changing the evaluation function based on the one selected test object image,
wherein when a test object image for whish a highest value for the evaluation function is obtained and the selected test object image are different from each other, the evaluation function is changed so that the value for the evaluation function obtained for the selected test object image becomes the highest value among the captured test object images.

* * * * *